United States Patent
Heaps et al.

(10) Patent No.: US 11,143,188 B2
(45) Date of Patent: Oct. 12, 2021

(54) VACUUM PUMP REED VALVE WHICH WILL REDUCE COLD START TORQUE

(71) Applicant: WABCO EUROPE BVBA, Brussels (BE)

(72) Inventors: David Heaps, Haworth (GB); Simon Warner, Pontefract (GB)

(73) Assignee: ZF CV SYSTEMS EUROPE BV, Brussels (BE)

(*) Notice: Subject to any disclaimer, the term of this patent is extended or adjusted under 35 U.S.C. 154(b) by 45 days.

(21) Appl. No.: 16/619,953

(22) PCT Filed: Jun. 9, 2017

(86) PCT No.: PCT/EP2017/000678
§ 371 (c)(1),
(2) Date: Dec. 6, 2019

(87) PCT Pub. No.: WO2018/224117
PCT Pub. Date: Dec. 13, 2018

(65) Prior Publication Data
US 2020/0116150 A1 Apr. 16, 2020

(51) Int. Cl.
*F04C 29/12* (2006.01)
*F04C 25/02* (2006.01)
(Continued)

(52) U.S. Cl.
CPC ............ *F04C 29/128* (2013.01); *F04C 25/02* (2013.01); *F04C 28/06* (2013.01); *F16K 15/16* (2013.01);
(Continued)

(58) Field of Classification Search
CPC ..... F04C 29/128; F04C 25/02; F04C 2220/10; F04C 2220/12; F04C 15/068;
(Continued)

(56) References Cited

U.S. PATENT DOCUMENTS

| | | | | | |
|---|---|---|---|---|---|
| 1,578,880 | A | * | 3/1926 | De Luiz | F04B 39/1073 417/551 |
| 3,138,321 | A | * | 6/1964 | Bielefeld | F04C 18/344 418/236 |

(Continued)

FOREIGN PATENT DOCUMENTS

| | | |
|---|---|---|
| EP | 2853747 A1 | 4/2015 |
| EP | 2745016 B1 | 3/2016 |

(Continued)

*Primary Examiner* — Mark A Laurenzi
*Assistant Examiner* — Xiaoting Hu
(74) *Attorney, Agent, or Firm* — Leydig, Voit & Mayer, Ltd

(57) ABSTRACT

A vacuum pump suitable for mounting to an engine includes: a casing having a cavity, the cavity including an inlet and an outlet; a moveable member arranged for rotation inside the cavity, the movable member being movable to draw fluid into the cavity through the inlet and out of the cavity through the outlet so as to induce a reduction in pressure at the inlet; a valve seat at the outlet; and an outlet valve including a reed element and a stop for restricting movement of the reed element. The stop is movable between a first operating position, in which movement of the reed element is restricted to a first opening degree, and a second start-up position, in which movement of the reed element is restricted to a second opening degree, which is larger than the first opening degree.

17 Claims, 12 Drawing Sheets

(51) Int. Cl.
 *F16K 15/16* (2006.01)
 *F04C 28/06* (2006.01)
 *F04C 18/344* (2006.01)
(52) U.S. Cl.
 CPC ........ *F04C 18/344* (2013.01); *F04C 2220/10* (2013.01)
(58) Field of Classification Search
 CPC ........ F04C 18/344; F04B 37/14; F04B 37/16; F04B 39/1073; F04B 39/108; F04B 39/1086; F04B 53/1085; F04B 53/1087; F16K 15/03; F16K 15/031; F16K 15/033; F16K 15/16; F01L 3/205
 See application file for complete search history.

(56) References Cited

U.S. PATENT DOCUMENTS

| | | | | |
|---|---|---|---|---|
| 3,472,446 | A * | 10/1969 | Linnert | F04B 39/125 417/539 |
| 5,247,912 | A * | 9/1993 | Boyesen | F01L 3/205 123/65 V |
| 6,123,528 | A * | 9/2000 | Sun | F04C 29/128 137/527 |
| 2003/0066563 | A1 * | 4/2003 | Hong | F16K 15/16 137/514 |
| 2007/0148025 | A1 * | 6/2007 | Higashi | F04B 39/1073 417/559 |
| 2015/0211520 | A1 | 7/2015 | Otsuka | |
| 2015/0285247 | A1 * | 10/2015 | Moeller | F04B 47/00 251/313 |
| 2016/0312783 | A1 * | 10/2016 | Tirgovet | F16K 15/16 |

FOREIGN PATENT DOCUMENTS

| | | | | |
|---|---|---|---|---|
| GB | 2338749 | A | 12/1999 | |
| JP | 58098680 | A * | 6/1983 | ............ F04C 29/128 |
| JP | 2002371965 | A * | 12/2002 | ............ F04C 29/128 |
| JP | 2002371965 | A | 12/2002 | |
| JP | 2009264243 | A | 11/2009 | |
| WO | WO 2009018906 | A1 | 2/2009 | |
| WO | WO 2015090715 | A1 | 6/2015 | |
| WO | WO 2016108171 | A1 | 7/2016 | |

* cited by examiner

VACUUM PUMP REED VALVE WHICH WILL REDUCE COLD START TORQUE

CROSS-REFERENCE TO PRIOR APPLICATIONS

This application is a U.S. National Phase application under 35 U.S.C. § 371 of International Application No. PCT/EP2017/000678, filed on Jun. 9, 2017. The International Application was published in English on Dec. 13, 2018 as WO/2018/224117 under PCT Article 21(2).

FIELD

The invention relates to a vacuum pump suitable for mounting to an engine, comprising a casing having a cavity, and a movable member arranged for rotation inside the cavity, wherein the cavity is provided with an inlet and an outlet and the movable member is movable to draw fluid into the cavity through the inlet and out of the cavity through the outlet so as to induce a reduction in pressure at the inlet, and further comprising a valve seat at the outlet and an outlet valve comprising a reed element and a stop for restricting movement of the reed element. The invention moreover relates to a vehicle comprising a vacuum pump of the aforementioned type.

BACKGROUND

A vacuum pump of the aforementioned type for example is known from EP 2 853 747 A1. The vacuum pump disclosed therein is a sliding vane vacuum pump including a casing with a cover which together define a cavity, a rotor and a vane slidably mounted to the rotor. The pump further includes an inlet passage extending from the exterior of the pump to the cavity and an outlet passage extending from the cavity to the exterior of the pump. The outlet passage is provided with a reed valve comprising a reed element and a stop. The stop restricts the movement of the reed element. In the idle state the reed element closes the outlet passage and when fluid is pushed out of the outlet, the reed element is moved away and comes into contact with the stop which restricts the movement of the reed element. The stop is in the form of a bent metal element which is fixed to the casing by means of a screw.

The restriction of the movement of the reed element is necessary to increase durability of the reed element. The reed element is a flexible element, made for example out of a flat sheet metal or plastic material. During operation of the vacuum pump, the reed element is moved multiple times from the idle state (a first position) to the open state (a second position). When no stop would be provided, the reed element would be excessively bent which could result in a fatigue breakage of the reed element. Thus, the stop restricts the movement of the reed element to an acceptable degree.

When the engine of the car is started after a while, the oil within the vacuum pump is still cold and thus the viscosity of the oil is high. Moreover, when the vacuum pump is mounted to a lower region of the engine, the cavity of the vacuum pump may be filled with oil to a certain degree, or completely filled with oil. Thus, during the first revolutions of the rotor of the vacuum pump, the oil needs to be pushed out of the outlet. During these initial revolutions the stop hinders the oil of being pushed out of the cavity, since the opening degree of the reed element is restricted by the stop. The oil needs to flow approximately at a right angle out of the outlet.

Therefore, it is desirable to provide a vacuum pump, which would allow the oil to escape from the pump in a simple manner.

One solution to this problem is disclosed in WO 2009/018906. The solution disclosed therein is based on the idea of having two different outlets of the vacuum pump, one small outlet and one enlarged outlet. The enlarged outlet is provided with an additional reed element, which is only moved away under very high pressures. Thus, during normal operation only the small outlet is opened by the reed element and when oil is pumped out of the cavity during initial start, the second outlet will be opened additionally.

However, a drawback of this solution is that the opening is enlarged and the risk of air being drawn back to the cavity is relatively high.

A different solution is disclosed in WO 2015/090715. Therein, it is proposed to provide an additional reed element, which is stiffer than the main reed element. The additional reed element is elliptically bent and arranged between the stop and the main reed element. When pressure is very high, the main reed element will be pushed against the additional reed element and the main reed element and the additional reed element together will move against the stop. Thus, during normal operation when only air is pumped, the main reed element is restricted in its movement by the additional reed element, which is stiffer. Only in very high loads, both reed elements are restricted in their movement by means of the stop.

A still further solution is disclosed in WO 2016/108171. This solution incorporates a second valve, so-called drain valve, for the oil to be ejected from the pump.

Further vacuum pumps with reed valves are disclosed in US 2015/0211520, EP 2 745 016 B1 and JP 2009 264243 A.

A drawback of the known solutions is that either the outlet is enlarged in its cross section, which makes it more difficult to provide a tight closure of the outlet valve, and other solutions add a second valve, or a second reed element.

SUMMARY

In an embodiment, the present invention provides a vacuum pump suitable for mounting to an engine, comprising: a casing having a cavity, the cavity comprising an inlet and an outlet; a moveable member arranged for rotation inside the cavity, the movable member being movable to draw fluid into the cavity through the inlet and out of the cavity through the outlet so as to induce a reduction in pressure at the inlet; a valve seat at the outlet; and an outlet valve comprising a reed element and a stop configured to restrict movement of the reed element, wherein the stop is movable between a first operating position, in which movement of the reed element is restricted to a first opening degree, and a second start-up position, in which movement of the reed element is restricted to a second opening degree, which is larger than the first opening degree.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
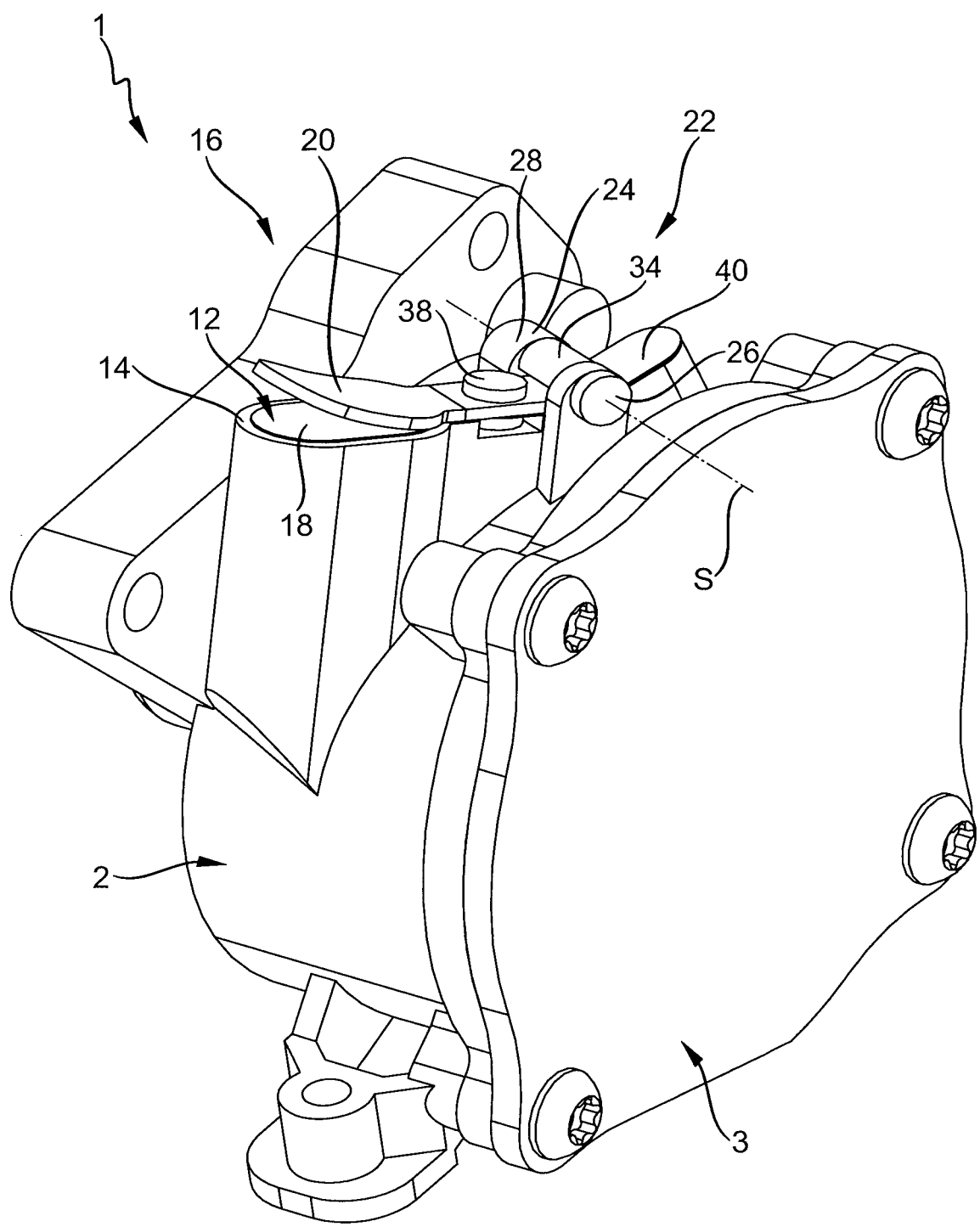
FIG. 1 a perspective view of a vacuum pump according to the invention.

In an embodiment, the present invention provides a vacuum pump which addresses the above drawbacks and which is able to eject oil in the initial start in an effective and efficient manner.

This object is solved by a vacuum pump of the aforementioned type in that the stop is movable between a first operating position, in which movement of the reed element is restricted to a first opening degree, and a second start-up position, in which movement of the reed element is restricted to a second opening degree which is larger than the first opening degree. The invention is based on the idea that the stop, which previously was fixed in one single position, is now made movable. The inventors of the present invention have discovered that it is acceptable to allow the reed element to move further, thus bend to a higher extent, during the start-up phase of the vacuum pump. During normal operation, the movement of the reed element is restricted to the first position of the stop, while during the start-up phase of the vacuum pump, movement of the reed element is restricted up to the second start-up position of the stop. Thus, by providing a movable stop it is possible to use one single outlet and one single reed element while at the same time providing an outlet which is large enough to effectively eject oil during the start-up phase of the vacuum pump. When the stop is in the second start-up position the opening degree is larger than in the first operating position. Thus, the ejected oil does not need to travel along a 90° angle, but can flow out of the vacuum pump substantially straight. This also substantially decreases the torque on the vacuum pump, which is required for ejecting the oil.

When the pressure at the outlet reduces after the start-up phase, the stop again is in the first operating position and movement of the reed element is restricted to the first opening degree.

According to a first preferred embodiment of the invention, the second opening degree is at least twice the first opening degree. The opening degree is preferably measured by the opening angle of the reed element, and/or a distance between a tip of the reed element and the respective valve seat formed ad the outlet. The distance is preferably measured along a straight line connecting the tip of the reed element and the respective valve seat.

According to a further preferred embodiment, the vacuum pump comprises a holding arrangement attaching the stop to the casing, said holding arrangement allowing the movement of the stop between the first and second positions. Preferably, the stop is attached to the casing via a hinge. In this instance, the holding arrangement preferably comprises the hinge, such that the stop is hinged against the casing. The hinge is adapted to provide movement to the stop, such that the stop can move between the first operating position and the second start-up position.

In a particularly preferred embodiment, the stop comprises a through-hole and a hinge comprises a hinge pin running through the through-hole and being received in a respective receiving portion of the housing. Preferably, the through-hole is formed by a tail of the stop, being rolled to a tube and a hinge pin runs through the tube and is attached to the casing. This is a very simple solution for forming the hinge. The stop is generally formed out of a sheet metal, e.g. by punching the stop out of the sheet metal and then brought into its final shape by means of bending. In the step of bending, it is very simple to roll a portion of the stop, preferably the rear portion, for forming the tube, which serves as a part of the hinge.

In an alternative, a fixing rod is positioned in a through-opening of the stop for attaching the stop to the casing, said fixing rod having a head for restricting the movement of the stop. Such a fixing rod is preferably formed as a screw. As known in the state of the art, stops are attached to the casing by means of screws. When this screw is not positioned such that the head of the screw presses the stop against the casing, but with some clearance, movement of the stop is allowed. In this regard, such a screw or a similar fixing rod with a head can be used to attach stops in a manner to provide them with the freedom to move. Preferably, the fixing rod is adjustable for adjusting the second position of the stop. The head of the fixing rod defines the second start-up position of the stop, since the head restricts the movement of the stop. When a screw is used, the adjustment can be carried out by screwing the screw with respect to the casing, such that the distance between the casing and the head is adjusted.

According to a further embodiment of the invention, the stop is biased into the first position. This ensures that during normal operation movement of the reed element is restricted to the first opening degree.

In a particularly preferred embodiment, the stop is biased by a biasing force provided by the reed element. In this embodiment, the reed element is used with two functions, firstly for closing the outlet and secondly for biasing the stop into the first operating position. The reed element is made out of a flexible material, which has a spring force, such that it can be beneficially used for biasing the stop into the first operating position. This results in fewer parts to be assembled and, thus, in a cost effective vacuum pump.

Moreover, it is preferred that the vacuum pump comprises a spring, wherein said spring provides a biasing force for biasing the stop into the first operating position. The spring can be used in addition or alternatively to the biasing force provided by the reed element. In one alternative, the spring can be formed as a torsion spring. Such a torsion spring may be arranged at the connection point between the stop and the casing, e.g. at the hinge between the stop and the casing. In a second alternative, the spring is formed as a compression spring, which directly acts on the stop via a support, which is fixed to the casing. In a still further alternative, the spring is a tension spring, which is arranged between the stop and the casing, pulling the stop against the casing.

According to a further preferred embodiment, the reed element is attached to the stop at a connection point, which is arranged between an attachment of the stop to the casing and the outlet opening. Preferably, the reed element is attached to the stop by means of a rivet. Also, further attachment means are preferred as, e.g. welding, adhering, screwing or clamping. The rivet is a very simple way to fix the reed element against the stop. When the connection point is arranged between the attachment of the stop to the casing as, e.g. the hinge, and the outlet opening, the reed element can be used in a beneficial manner for biasing the stop into the first operating position.

Preferably, the casing comprises a shoulder and the reed element comprises a rear extension, wherein the rear extension is seated on the shoulder. In this embodiment, the rear extension of the reed element preferably acts as a biasing element. When the stop is moved from the first operating position to the second start-up position, the reed element is bent relative to its rear extension, which is still seated on the shoulder. Due to the bending of the reed element a spring force acts on the reed element. The same spring force also acts on the stop, when the reed element is connected to the stop. Thus, the spring force of the reed element pulls the stop into the first operating position. This is a very simple and cost effective way of providing an effective and efficient reed valve with a movable stop, which is biased into the first operating position.

Preferably, the shoulder is formed such that the reed element is tensioned against the valve seat. The shoulder is formed such that the reed element is permanently slightly bent and therefore set under tension so that it is tensioned against the valve seat. Alternatively, the reed element itself might be curved, shaped or angled in its idle state. In this alternative, the shoulder can be flat.

Preferably, the shoulder includes an angle with the valve seat in the range of 10° to 60°, 20° to 60°, 30° to 60°, preferably 20° to 45°, more preferred about 25° to 35°. It has shown that angles in these ranges provide a sufficient biasing force. The angle may be chosen in accordance with the material of the reed element.

In a further preferred embodiment, the vacuum pump further comprises an oil relief passage, the oil relief passage terminating in an oil relief opening in the casing, wherein the rear extension of the reed element covers the oil relief opening. The oil relief opening can be used to relieve oil from the vacuum pump and prevent hydraulic locking in the event of reverse rotation of the engine. The oil relief passage is also closed by the reed element. This is a very simple manner for also providing the oil relief passage with an effective valve element. This embodiment, in particular, is beneficial when the oil relief opening is provided in the shoulder, which is angled. In this arrangement, the reed element is under permanent tension and as such permanently tensioned against the oil relief opening for closing the oil relief opening. An additional check valve within the oil relief passage in this embodiment can be avoided. This again results in a simple vacuum pump, which is simple in construction and in assembly as well as in maintenance.

According to a second aspect of the invention, the object stated in the introductory portion is also solved by a vehicle comprising a vacuum pump according to at least one of the previously described preferred embodiments of a vacuum pump according to the first aspect of the invention.

Figure 5:
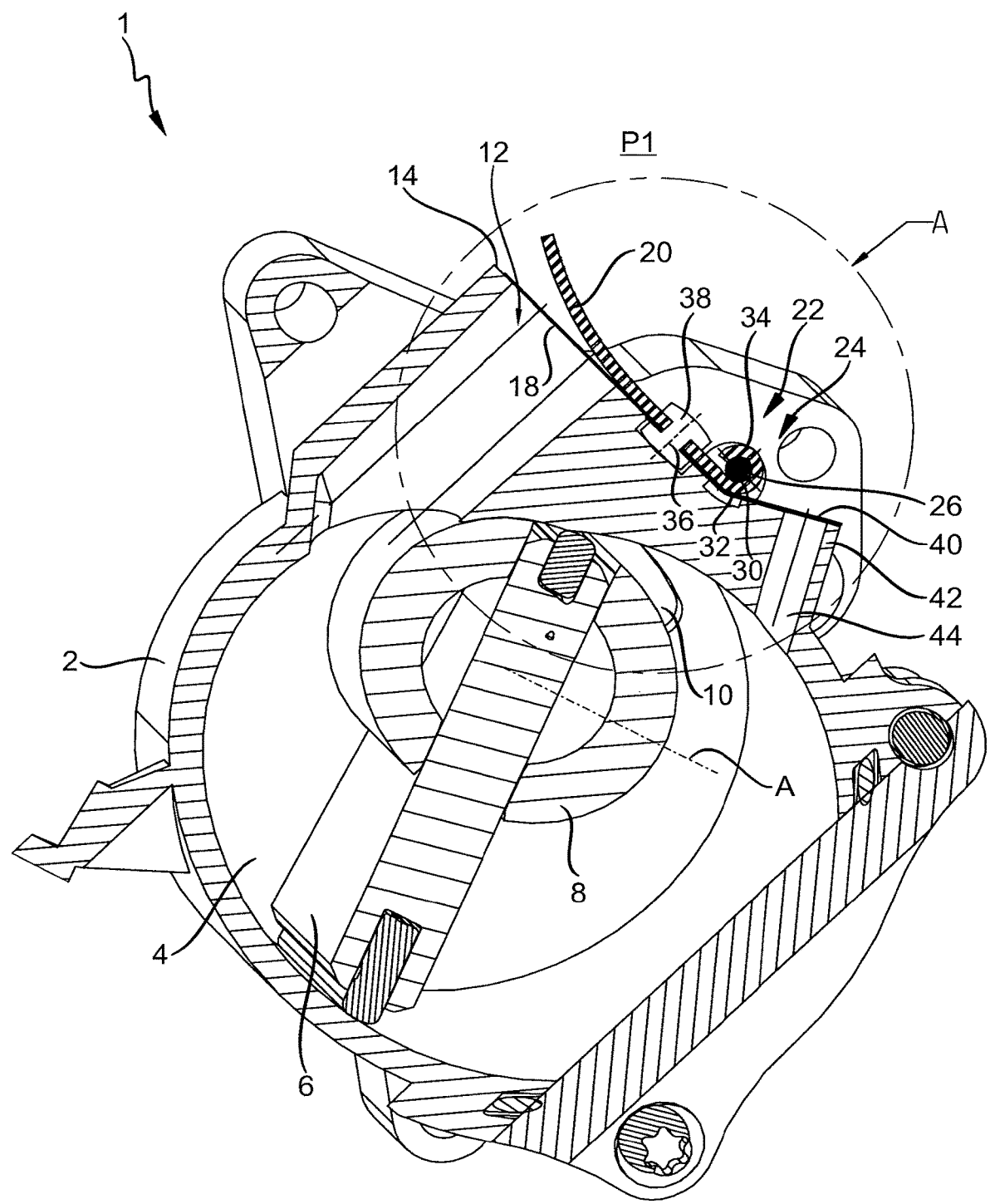
FIG. 5 a cut through the vacuum pump with the stop in the first operating position.
Figure 6:
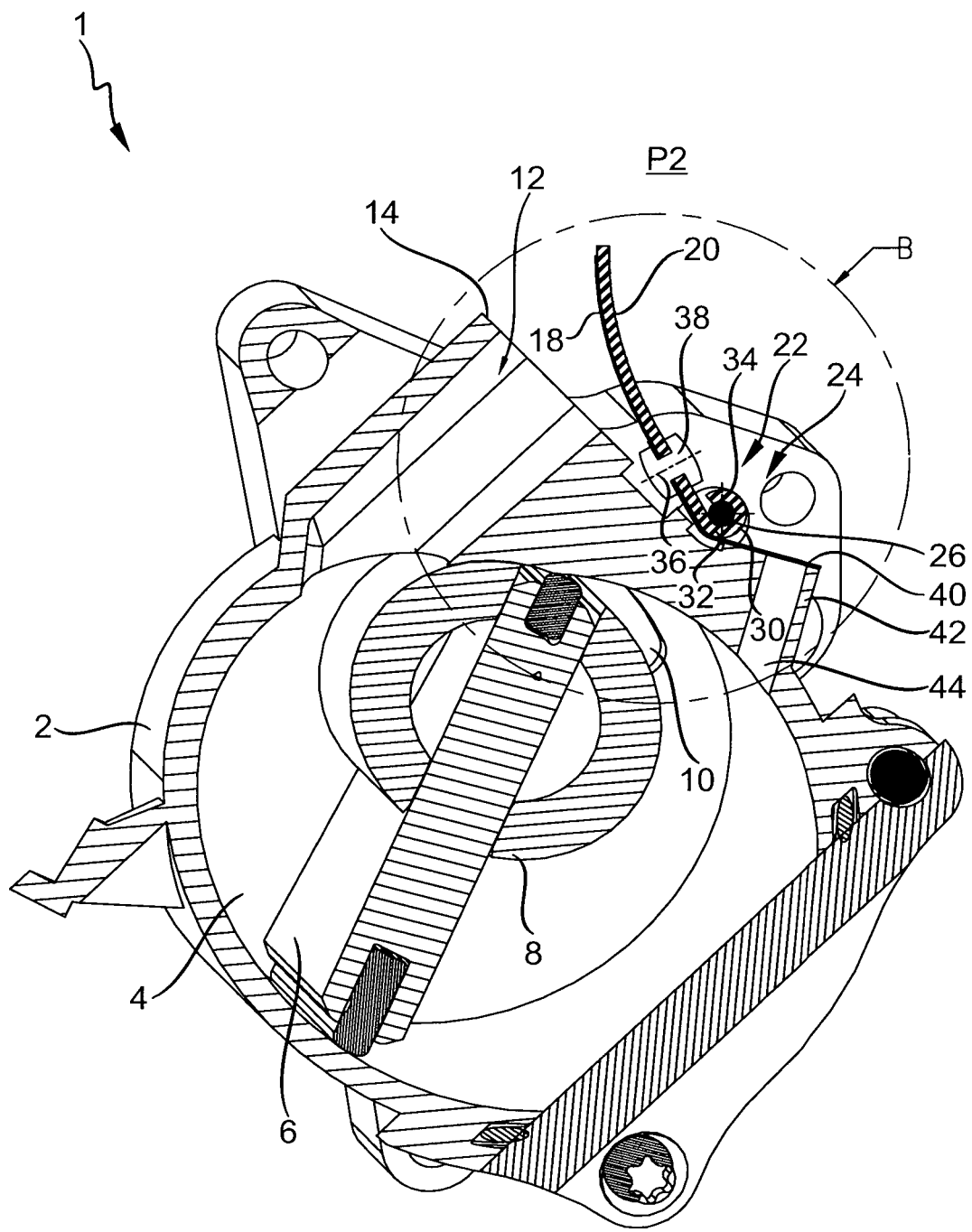
FIG. 6 the cut of FIG. 5 with the stop in the second start-up position.
Figure 7:
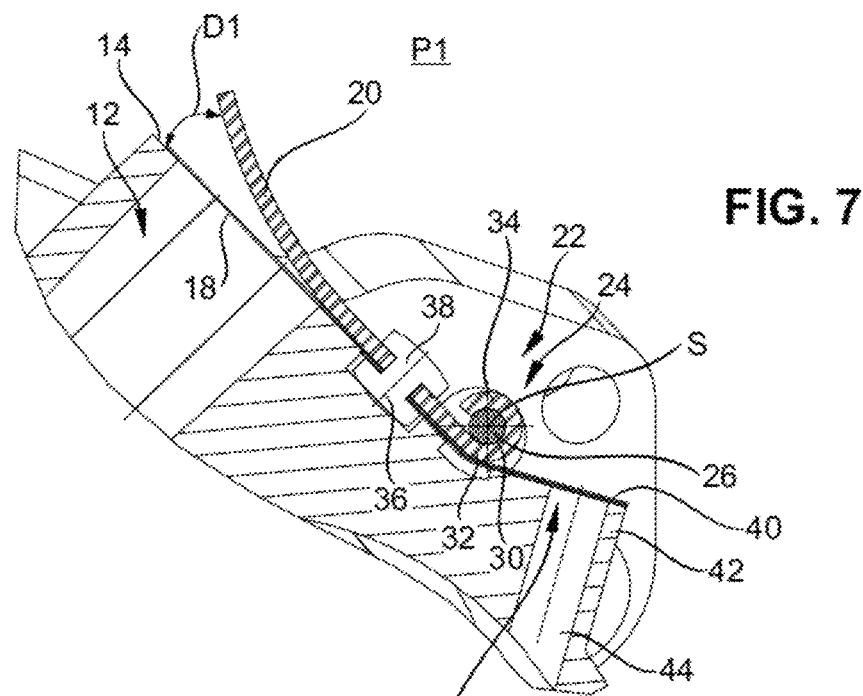
FIG. 7 detail A from FIG. 5.

The vacuum pump 1 comprises a casing 2 (see FIG. 1). The casing 2 is closed by a cover 3 and defines together with the cover 3 an internal cavity 4 (see FIGS. 5 and 6). With reference to FIG. 5, in which the cover 3 is cut away, a movable member 6 is provided within the cavity 4. The movable member 6 in this embodiment is formed as a mono vane. The movable member 6 is seated in a rotor 8 which is rotatable about a rotational axis A. When the rotor 8 rotates, also the movable member 6 is forced into rotation and gas, in particular air, is drawn through an inlet 10 and pushed out of an outlet 12. This rotating action induces a vacuum at the inlet 10 which can be used by a consumer inside e.g. a vehicle.

The outlet 12 is provided with a valve seat 14. The valve seat 14 is part of an outlet valve 16 which forms a check valve for the outlet 12. The outlet valve 16 comprises a reed element 18. The reed element 18 engages in the idle state with the valve seat 14 for closing the outlet 12. The idle state is shown in FIGS. 1, 3 to 5, 7, and 9 to 11. In the idle state the outlet valve 16 is closed and air is inhibited from passing through the outlet 12 into the cavity 4.

Figure 2:
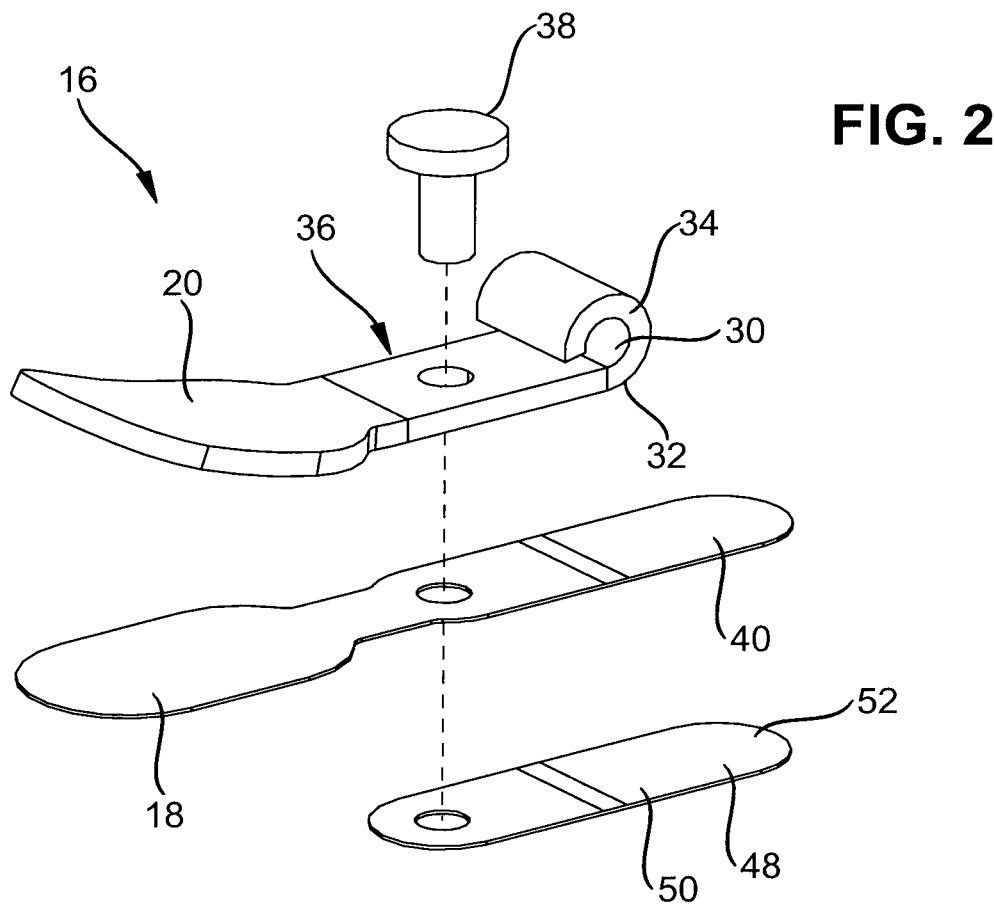
FIG. 2 an exploded view of a stop with a reed element.
Figure 3:
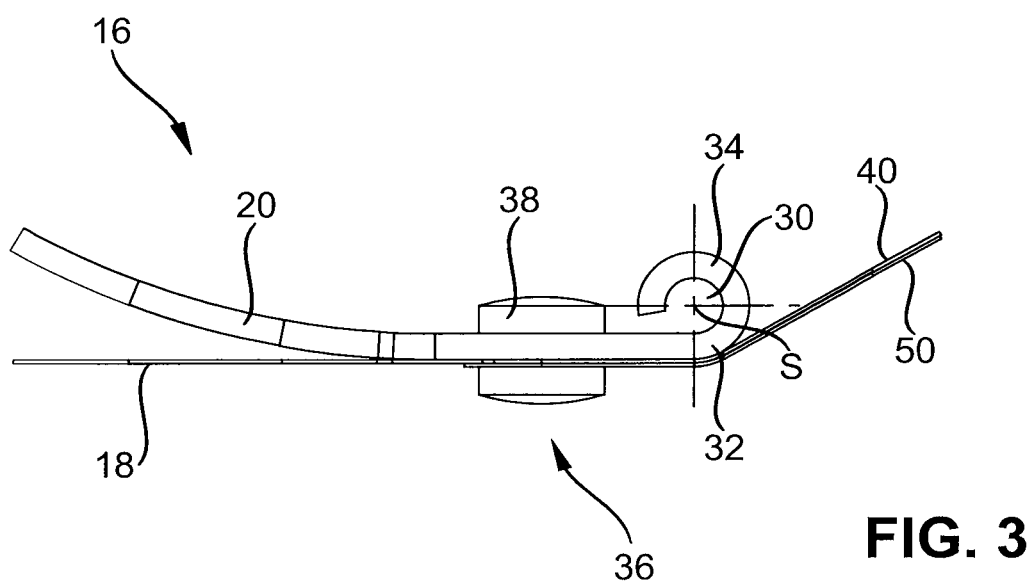
FIG. 3 the elements of FIG. 2 in an assembled view.
Figure 4:
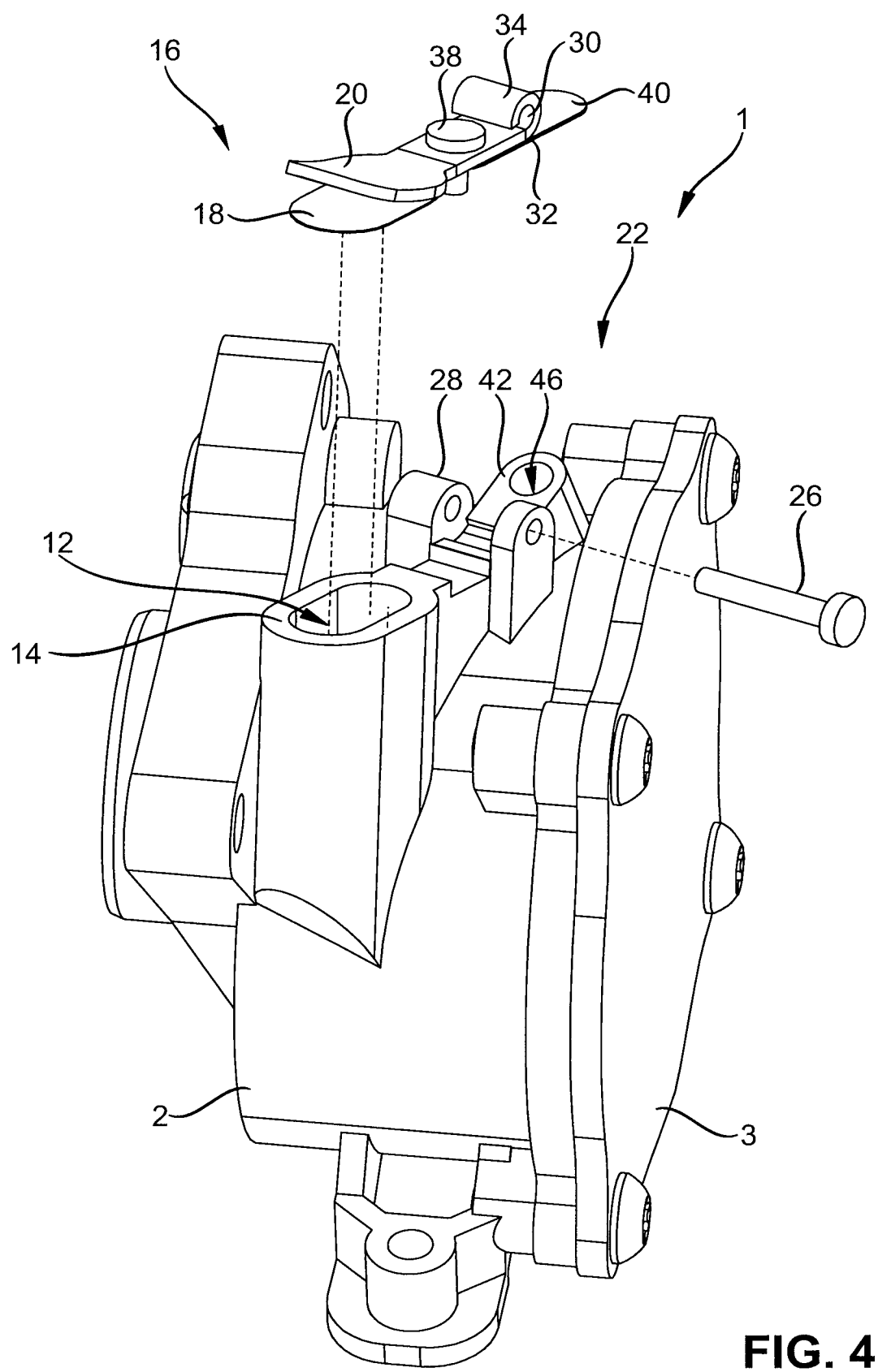
FIG. 4 an assembling view of the vacuum pump and the stop with a reed element.

The reed element is formed out of a flexible material and is thin and sheet-shaped (see FIGS. 2 and 3). When air is pushed through the outlet 12 by means of the movable member 6, the reed element 18 is pushed away and can open to a first opening degree D1 (see FIG. 7) such that air can pass through the outlet 12 out of the cavity. In general, such an arrangement and the function is known in the state of the art, e.g. from EP 2 853 747 A1.

The outlet valve 16 moreover comprises a stop 20 which is formed out of a sheet metal. The stop 20 has a curved shaped, e.g. is elliptically curved. The stop 20 restricts the movement of the reed element 18 to a first opening degree D1 (see FIG. 7). The stop 20 has a shape, such that excessive bending of the reed element is avoided, such that the reed element will not experience a fatigue breakage during normal operation.

Figure 8:
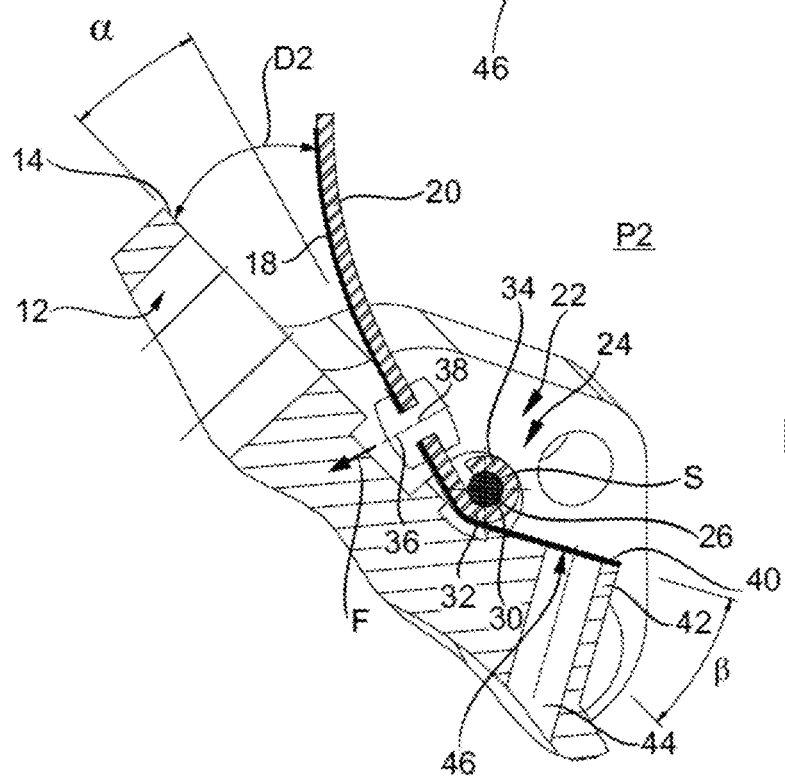
FIG. 8 detail B from FIG. 6.

According to the invention, the stop 20 is movable between a first operating position P1 (see FIG. 7) and a second start-up position P2 (see FIG. 8). For allowing the movement of the stop 20, the stop 20 is attached to the casing 2 by a holding arrangement 22. The holding arrangement 22 allows the movement of the stop 20 between the first operating position P1 and the second start-up position P2. In the embodiment shown in the figures, the holding arrangement 22 comprises a hinge 24. The hinge 24 comprises a hinge pin 26 which is received in a corresponding holding portion 28 of the casing 2 (see FIG. 4). The hinge pin 26 may be attached to the receiving portion 28 by a screw threaded portion, by clamping means, or the like. The hinge pin 26 goes through an opening 30 in the stop 20. While in general the opening 30 can be formed of any type, in this embodiment the opening 30 is formed by a tail 32 of the stop 20 being rolled to a tube 34. The hinge pin 26 in this instance runs through the tube 34 for attaching the stop 20 to the casing 2.

This arrangement allows the stop 20 to be pivoted about a pivot axis S from the first operating position P1 to the second start-up position P2. It shall be understood that the second start-up position P2 is not necessarily a fixed and defined position, but may vary dependent on the pressure applied to the stop 20 when air is ejected from the outlet 12. The second start-up position P2 in this instance is at least different from the first operating position P1 and allows a larger opening degree D2 than the opening degree D1 of the reed element 18 when the stop 20 is in the first operating position P1.

In FIG. 8 it is shown that the stop 20 is moved into the second start-up position P2 and thus is pivoted about the pivot axis S by an angle α which in the embodiment shown in FIG. 8 is about 15°. The angle α however may also be in the range of 10° to 90°, preferably 10° to 60°, more preferred 10° to 45°, 10° to 30° or 10° to 20°. The angle α in particular is dependent on the length of the stop 20 measured perpendicular to the pivot axis S and also from the distance between the pivot axis S and the outlet 12. When the distance between the pivot axis S and the outlet 12 is larger, a smaller opening angle 12 may be sufficient to provide an effective and efficient ejection of oil.

The stop 20 and the reed element 18 are attached to each other at a connection point 36. In this embodiment, the stop 20 and the reed element are attached to each other by a rivet 38. A rivet is a simple element which is cost effective and thus results in a cost effective vacuum pump 1.

The reed element 18 comprises a rear extension 40. The rear extension 40 of the reed element 18 extends in the opposite direction from the opening 12, when the reed element 18 is mounted to the casing 2, relative to the connection point 36. The rear extension 40 is used as resilient means so that the reed element 18 and stop element 20 are held pressed against the valve seat such that air is prevented from entering the outlet 12.

With reference to FIG. 2, it can be seen that the reed element 18 in the dissembled state is substantially flat. The rear extension 40 in the assembled state (see e.g. FIGS. 1, 5 to 11) is slightly bent upwards, thus resulting in a corresponding force pressing the reed element 12 against the valve seat 14. The rear extension 40 in particular is seated on a shoulder 42 such that the rear extension 40 is bent upwardly. Shoulder 42 includes an angle β with a plane of the valve seat 14 (see FIG. 8). Angle β in this embodiment (see FIG. 8) is approximately 30°. However, it is also preferred that the angle β is in the range of 20° to 60°, preferably 20° to 45°, more preferred about 25° to 35°.

Due to the connection between the reed element 18 and the stop 20 at the connection point 36, which is offset from the pivot axis S and arranged between the pivot axis S and the opening 12, the reed element 18 will pull the stop 20 into the first operating position, due to its tensioning force, which is provided by the slightly bent up rear extension 40. Thus, the stop 20 is permanently pushed into the first operating position P1 caused by the reed element 18.

The rear extension 40 in this embodiment also is used for a second purpose. The vacuum pump 1 comprises an oil relief passage 44, terminating in an oil relief opening 46 in the casing 2. The oil relief passage 44 is used to permit oil entrained by a reverse rotation of the rotor 8 and vane 6 to be vented from the cavity 4 through the oil relief passage 44 and the oil relief opening 46 before a hydraulic lock can occur. The oil relief opening 46 in this embodiment is closed by the rear extension 40 of the reed element. The oil relief passage 44 thus is arranged that it runs through the shoulder 42 and the oil relief opening 46 terminates in the shoulder 42. Since the reed element 18 is under permanent tension due to the shoulder 42, the rear extension 40 is permanently tensioned against the oil relief opening 46 and therefore provides a permanent and effective seal. Thus, no air will be drawn through the oil relief opening 46 during normal operation of the vacuum pump 1. However, when rotor 8 and vane 6 are reversely rotated, oil may be pushed through the oil relief passage 44 and the oil relief opening 46 out of the cavity 4.

In a further development of this embodiment the outlet valve 16 is provided with a spring 48. The spring 48 is only optional. Spring 48 is used to provide a tensioning force to the stop 20 to bias the stop 20 into the first operating position P1 (see FIG. 7).

In a first alternative (see FIGS. 2 and 3) the spring 48 is formed as a leaf spring 50. Leaf spring 50 is attached to the stop 20 and the reed element 18 by means of the rivet 38. Leaf spring 50 comprises a leaf body 52 which is substantially formed in accordance with the rear extension 40 of the reed element 18. Thus, the leaf spring 50 extends into the rear direction and provides an extra force to the stop 20. In addition, the leaf body 52 also closes the oil relief opening 46. Therefore, the pressure required for pushing away the spring 50 and the rear extension 40 from the oil relief opening 46 is higher than the pressure required for pushing away the reed element 18 from the outlet opening 12. This arrangement further secures the oil relief opening 46 and effectively prevents air entering through the oil relief opening into the cavity 4.

Figure 9:
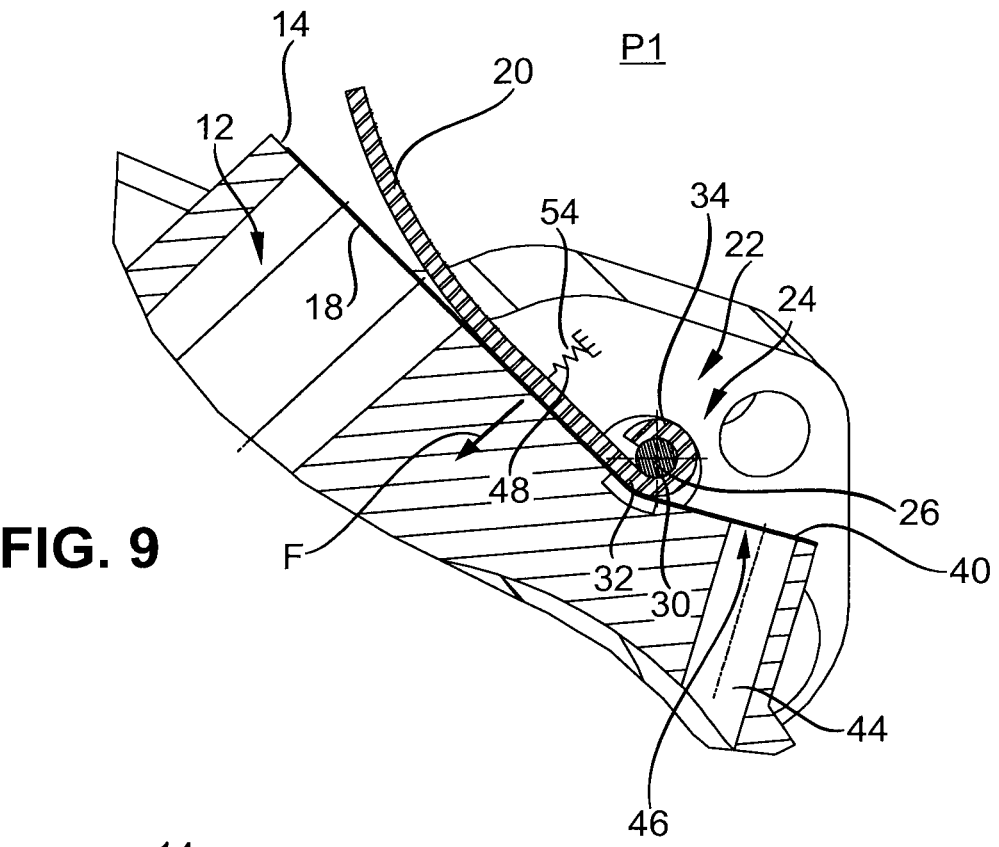
FIG. 9 the cut view of FIG. 7 in a second embodiment.

Now turning to FIG. 9, a second embodiment of the vacuum pump 1 is shown, in particular a second embodiment of the outlet valve 16.

The main difference between the second embodiment according to FIG. 9 and the first embodiment (FIGS. 1 to 8) is that the stop 20 is not attached to the reed element 18 by a rivet. In particular, the stop 20 and the reed element 18 are not attached to each other at all. The reed element 18 in this embodiment may be attached directly to the casing 2, e.g. by a not shown rivet, screw or adhesive bonding. However, it shall be understood that also a rivet 38 as in the first embodiment may be provided in this second embodiment.

For pushing the stop into the shown first operating position (FIG. 9) in the second embodiment a spring 48 is provided which is formed as a compression spring 54. The compression spring is connected to the stop 20 and to the casing 2 and exerts a biasing force for pushing the stop into the first operating position P1.

Figure 10:
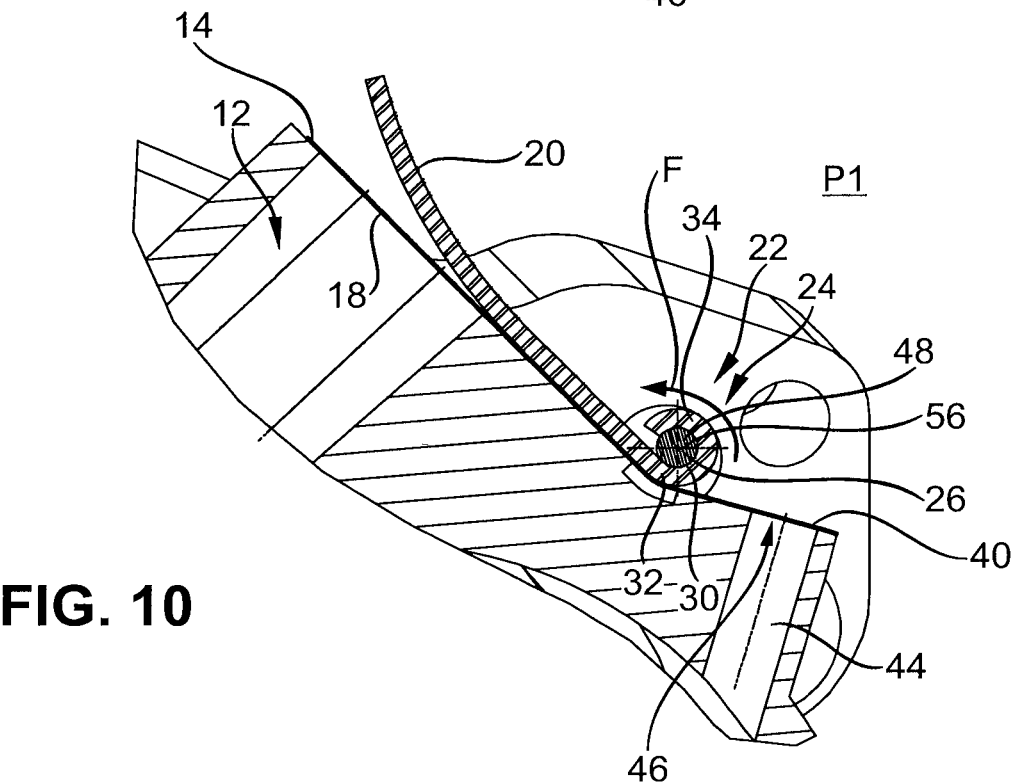
FIG. 10 the cut view of FIG. 7 in a third embodiment.
Figure 11:
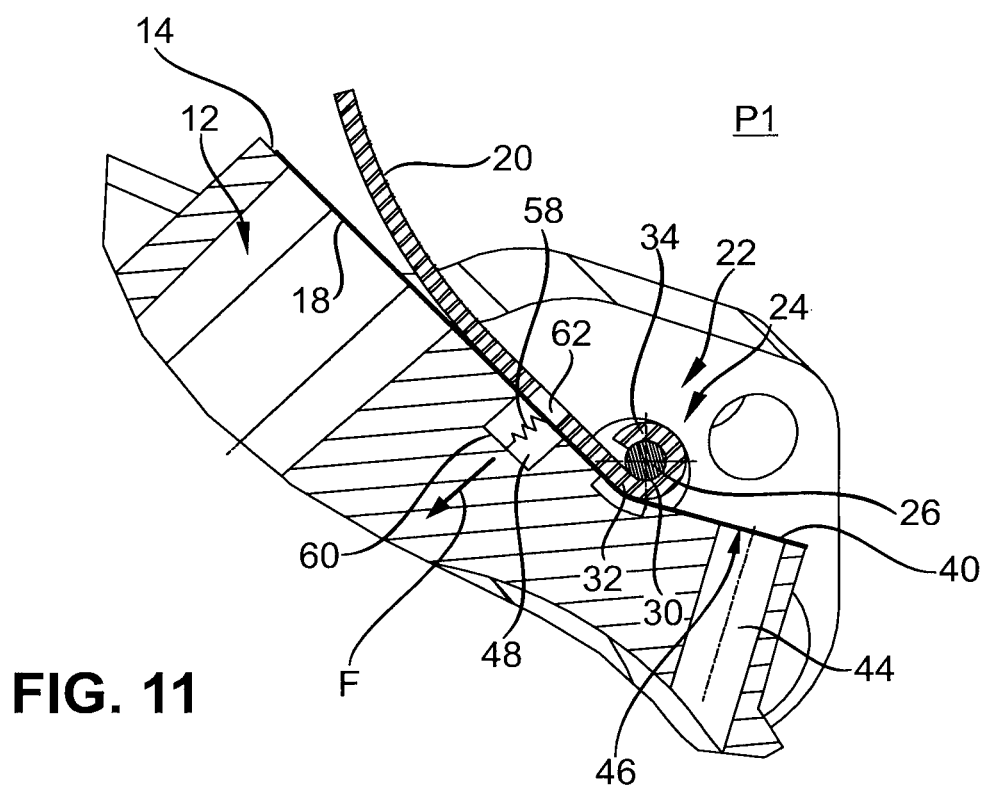
FIG. 11 the cut view of FIG. 7 in a fourth embodiment.

FIG. 10 shows a third embodiment. The difference between the second embodiment (FIG. 9) and the third embodiment (FIG. 10) is that the spring 48 is formed as a torsion spring 56. The torsion spring 56 is arranged in the area of the hinge 24 and on the one hand is supported by casing 2 and on the other hand is supported by the stop 20. Also the torsion spring 56 exerts a biasing force which pushes the stop 20 into the first operating position P1. A torsion spring 56 usually requires a limited mounting space and therefore is preferred.

In a third embodiment (see FIG. 11) the spring 48 is formed as a tension spring 58. The tension spring 58 is arranged in a recess 60 formed in the casing 2 and connected to the stop 20 at a connection point 62. The tension spring 58 can also be used to attach the reed element 18 to the stop 20. The tension spring 58 pulls the stop 20 into the first operating position P1.

The FIGS. 12 to 15 now illustrate a fifth embodiment of the vacuum pump 1 according to the invention. Identical and similar elements are depicted with references signs used above and in so far reference is made to the above description to the FIGS. 1 to 11. In the following in particular the differences of the fifth embodiment with respect to the first to fourth embodiments are described.

In particular, the outlet valve 16 has a different configuration. The outlet valve 16 comprises in accordance with the previously described embodiments the stop 20 and the reed element 18. The stop 20 however does not comprise a hinge which is formed by a tail 32 of the stop 20 being rolled into a tube 34 as previously described, rather the stop 20 comprises a flat extension 64 (see FIG. 13) through which a fixing rod 66 extends into a respective bore 68 formed in the housing 2 adjacent to the outlet 12. The reed element 18 comprises a similar extension 70. The fixing rod 66 extends through an opening 72 which is formed as an oblong hole of the stop 20 as well as through an opening 74 which also is formed as an oblong hole of the reed element 18. The fixing rod 66 moreover carries a spring 48 which is formed as a compression spring 76. The compression spring 76 abuts in the mounted state (see FIGS. 12, 14 and 15) against a head 78 of the fixing rod 66. By this arrangement, the stop 20 and the reed element 18 are attached to the housing 2.

In more detail (see FIGS. 14 and 15) the fixing rod 66 comprises a shaft 80 having a screw threaded portion 82 and a straight portion 84. Between the screw threaded portion 82 and the straight portion 84 a shoulder 88 is provided which is seated on a respective surface 90 of the housing 2.

The bore 68 comprises a screw threaded portion 92 which engages the screw threaded portion 82 of the shaft 80. The compression spring 76 is provided between the head 78 and abuts against the head 78 and the extension 64 of the stop 20. When the vacuum pump 1 according to the fifth embodiment is now in startup and the pressure within the cavity 4 is high, the reed element 18 as well as the stop 20 are pushed into the second position (FIG. 15), as already described above. The stop 20 is pushed into the second position against the force of the spring 76. The spring 76 is compressed by the movement of the stop 20 between the stop 20 and the head 78. Due to the compression of the spring 76, spring 76 exerts a force F into a closing position of the stop 20, thus into the first position. The movement of the stop 20 is allowed by the distance between the head 78 and the respective surface of the stop 20. The spring 76 is used to push the stop 20 into the first position.

Figure 12:
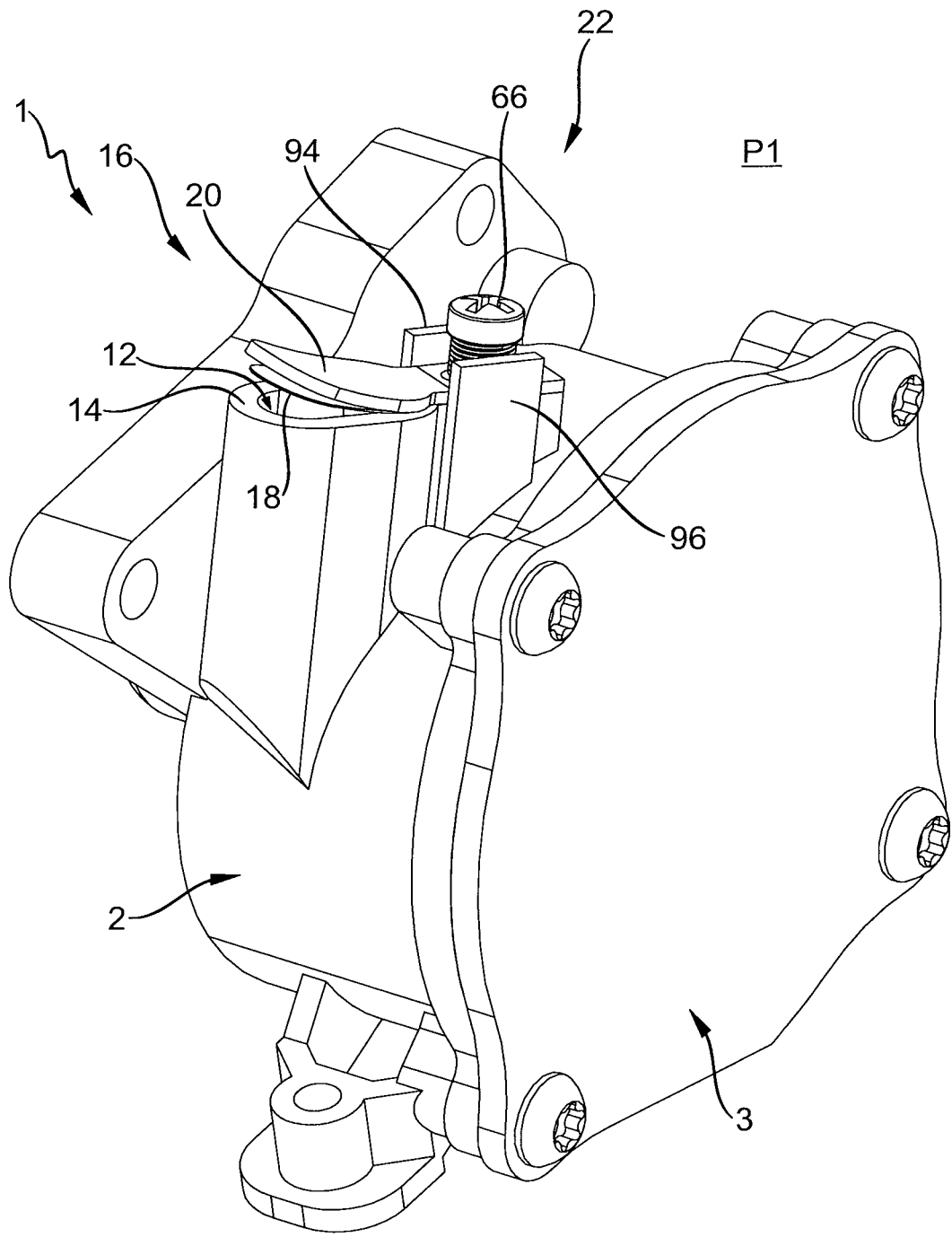
FIG. 12 a perspective view of a vacuum pump according to a fifth embodiment of the invention.
Figure 13:
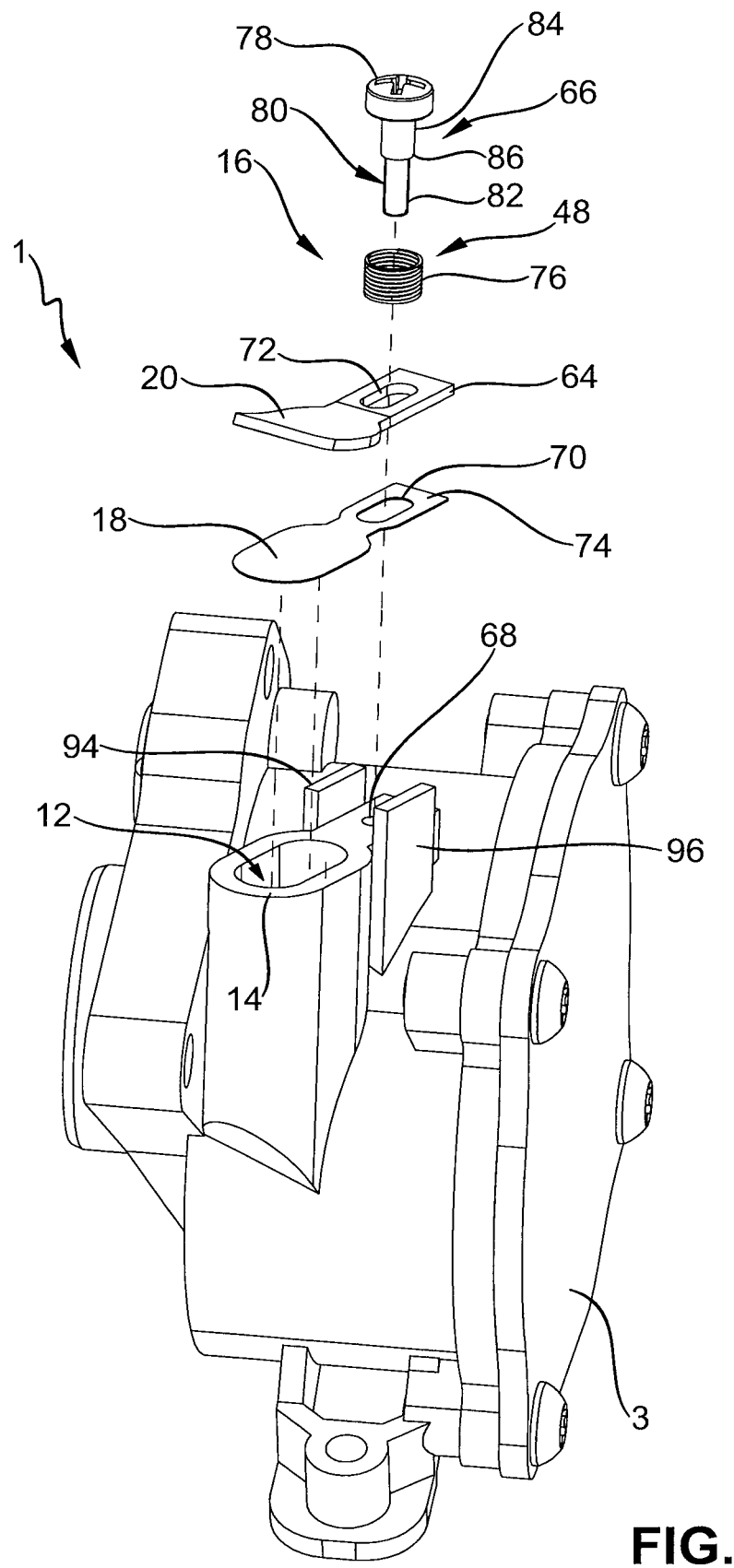
FIG. 13 an exploded view of the vacuum pump according to FIG. 12.
Figure 14:
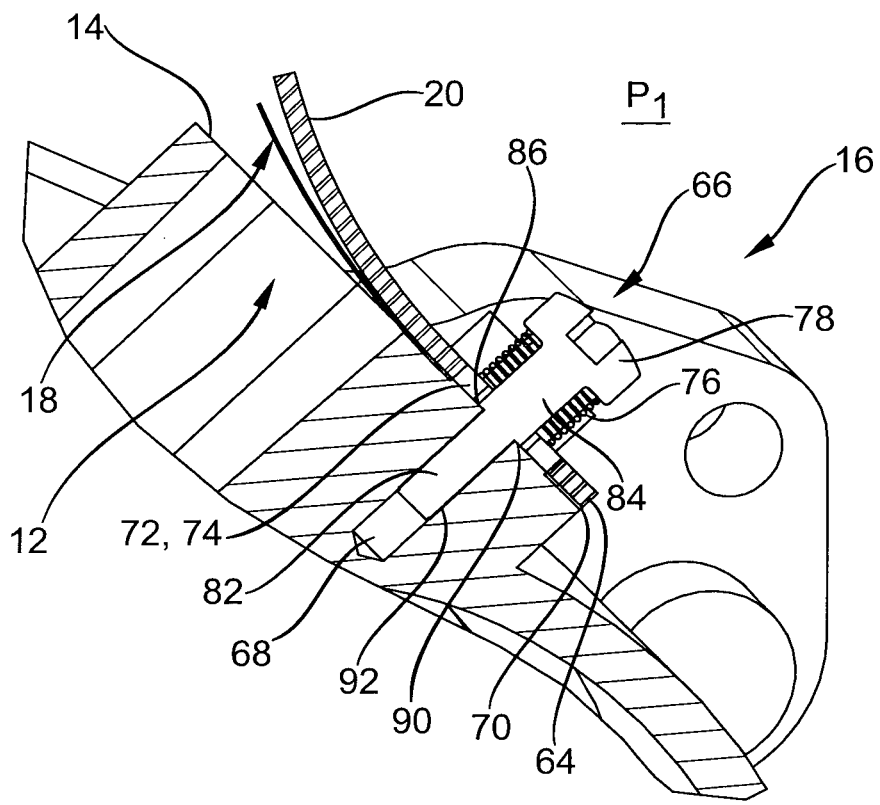
FIG. 14 a detailed view of the stop with a reed element according to the fifth embodiment in the first position.
Figure 15:
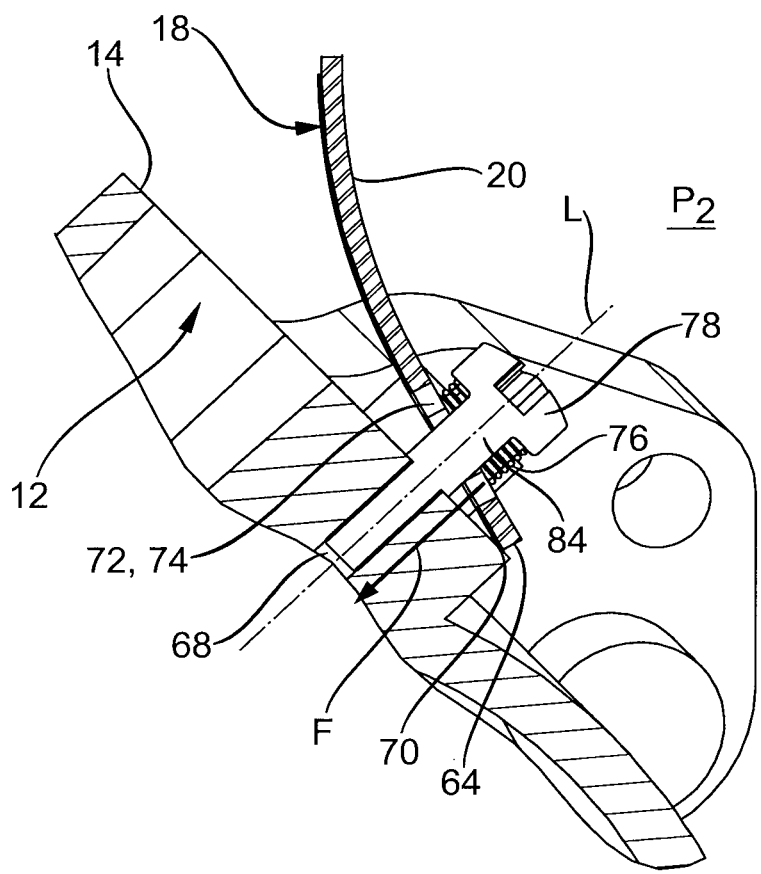
FIG. 15 a detailed view of the stop with a reed element according to the fifth embodiment in the second position.

To avoid a rotation of the stop 20 and/or the reed element 18 with respect to a longitudinal axis L of the fixing rod 66, first and second guiding walls 94, 96 are provided at the housing 2. The guiding walls 94, 96 restrict a rotation of the stop 20 and the reed element 18. Even though two walls are shown in FIGS. 12 and 13, the person skilled in the art will understand that also one wall is enough to restrict the rotation. Also, the person skilled in the art will understand that also different means for restricting the rotation could be provided, as e.g. a rear wall or an additional screw or clamp.

The walls 94, 96 have a height into the direction of longitudinal axis L such that rotation of the stop 20 and/or the reed element 18 is prohibited also in the second position P2.

Dependent on the axial length of the straight portion 84, or the position of the shoulder 80 respectively, the opening degree in the second position P2 can be adjusted. Moreover, it shall be understood that also the screw threaded portions 82, 92 can be formed such that they are self-locking; in such an embodiment shoulder 80 would not be necessary. When the screw threaded portions 82, 92 are provided in a self-locking manner, a simple adjustment can be carried out by screwing the fixing rod 66 into the bore 68 or releasing it.

Figure 16:
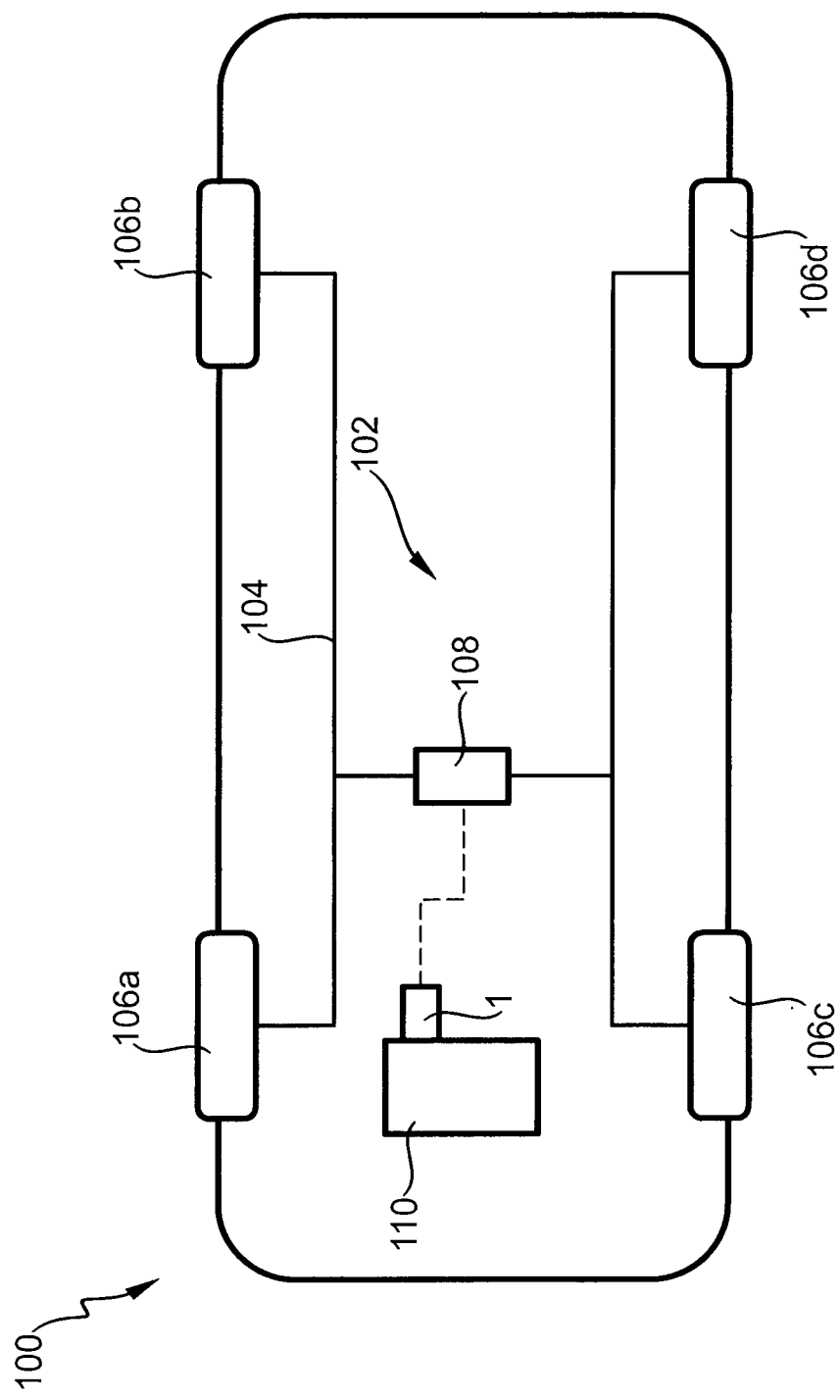
FIG. 16 a schematic view of a vehicle with the vacuum pump according to the invention.

FIG. 16 now depicts a schematic drawing of a vehicle 100. Vehicle 100 preferably is formed as a passenger car, or a light truck and comprises a hydraulic braking system 102. The braking system 102 is shown by lines 104 leading to wheels 106a, 106b, 106c, 106d for providing the wheels 106a, 106b, 106c, 106d with the respective braking pressure. Lines 104 are connected to a central module 108. The vehicle 100 moreover comprises an engine 110 and a vacuum pump 1 according to the invention, which is attached to the engine 110. Vacuum pump 1 provides the braking system 102 with vacuum, which e.g. could be used by a brake booster of the braking system 102, which could be implemented in the module 108.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS (PART OF THE SPECIFICATION)

1 vacuum pump
2 casing
3 cover
4 cavity
6 moveable member (vane)
8 rotor
10 inlet of cavity
12 outlet of cavity
14 valve seat
16 outlet valve
18 reed element
20 stop
22 holding arrangement
24 hinge
26 hinge pin
28 receiving portion
30 opening
32 tail of the stop
34 tube
36 connection point
38 rivet
40 rear extension
42 shoulder
44 oil relief passage
46 oil relief opening
48 spring
50 leaf spring
52 spring body
54 compression spring
56 torsion spring
58 tension spring 60 recess
62 connection point spring 58
64 extension of stop
66 fixing rod
68 bore in housing
70 extension of reed element
72 opening in stop (oblong hole)
74 opening in reed element (oblong hole)
76 compression spring
78 head of the fixing rod
80 shaft of fixing rod
82 screw threaded portion
84 straight portion
86 shoulder
90 surface (for shoulder 86)
92 screw threaded portion bore 68
100 vehicle
102 engine
A rotational axis
F biasing force
L longitudinal axis of fixing rod
S pivot axis
α opening angle stop
β angle of shoulder

The invention claimed is:

1. A vacuum pump suitable for mounting to an engine, comprising:
   a casing having a cavity, the cavity comprising an inlet and an outlet;
   a moveable member arranged for rotation inside the cavity, the movable member being movable to draw fluid into the cavity through the inlet and out of the cavity through the outlet so as to induce a reduction in pressure at the inlet;
   a valve seat at the outlet;
   an outlet valve comprising a reed element and a stop configured to restrict movement of the reed element; and
   a holding arrangement attaching the stop to the casing, the holding arrangement comprising a hinge,
   wherein the stop is movable between a first operating position, in which movement of the reed element is restricted to a first opening degree, and a second start-up position, in which movement of the reed element is restricted to a second opening degree, which is larger than the first opening degree.

2. The vacuum pump according to claim 1, wherein the second opening degree is at least twice the first opening degree.

3. The vacuum pump according to claim 1, wherein the holding arrangement is configured to allow movement of the stop between the first operating position and the second start-up position.

4. The vacuum pump according to claim 1, wherein the hinge is formed by a tail of the stop being rolled to a tube and a hinge pin running through the tube and being attached to the casing.

5. The vacuum pump according to claim 1, wherein the stop is biased into the first operating position.

6. The vacuum pump according to claim 5, wherein the stop is biased by a biasing force provided by the reed element.

7. The vacuum pump according to claim 5, further comprising a spring,
   wherein the spring provides a biasing force configured to bias the stop into the first operating position.

8. The vacuum pump according to claim 7, wherein the spring comprises a torsion spring.

9. The vacuum pump according to claim 7, wherein the spring comprises a compression spring.

10. The vacuum pump according to claim 1, wherein the reed element is attached to the stop at a connection point which is arranged between an attachment of the stop to the casing and the outlet.

11. The vacuum pump according to claim 1, wherein the casing comprises a shoulder and the reed element comprises a rear extension,
    wherein the rear extension is seated on the shoulder.

12. The vacuum pump according to claim 11, wherein the shoulder is formed such that the reed element is tensioned against the valve seat.

13. The vacuum pump according to claim 11, wherein the shoulder includes an angle with the valve seat in a range of 20° to 60°.

14. The vacuum pump according to claim 13, wherein the range is between 20° to 45°.

15. The vacuum pump according to claim 14, wherein the range is between 25° to 35°.

16. The vacuum pump according to claim 11, further comprising an oil relief passage, the oil relief passage terminating in an oil relief opening in the casing,
    wherein the rear extension of the reed element covers the oil relief opening.

17. A vehicle, comprising:
    the vacuum pump according to claim 1.

* * * * *